United States Patent [19]

Rempel et al.

[11] Patent Number: 4,858,637

[45] Date of Patent: Aug. 22, 1989

[54] GAS CONSUMPTION MEASURING SYSTEM

[75] Inventors: Garry L. Rempel, Waterloo; Navroz A. Mohammadi, Sarnia, both of Canada

[73] Assignee: University of Waterloo, Waterloo, Canada

[21] Appl. No.: 137,053

[22] Filed: Dec. 23, 1987

[30] Foreign Application Priority Data

Dec. 23, 1986 [GB] United Kingdom ................. 8630794

[51] Int. Cl.$^4$ ............................................ G05D 16/00
[52] U.S. Cl. ........................................ 137/12; 137/14; 137/487.5
[58] Field of Search ..................... 137/487.5, 14, 486; 422/242, 112, 113

[56] References Cited

U.S. PATENT DOCUMENTS

| | | | |
|---|---|---|---|
| 3,113,582 | 12/1963 | Hudson | 137/487.5 X |
| 3,297,412 | 1/1967 | Phillips | 422/112 |
| 3,586,027 | 6/1971 | Fitzgerald | 137/487.5 X |
| 3,926,563 | 12/1975 | Kotulak | 422/112 X |
| 3,963,043 | 6/1976 | Cota | 137/487.5 |
| 4,261,950 | 4/1981 | Bainbridge | 422/112 X |
| 4,687,014 | 8/1987 | Godal | 137/487.5 X |

Primary Examiner—Alan Cohan
Attorney, Agent, or Firm—Sim & McBurney

[57] ABSTRACT

An automated gas measuring system comprises a constant pressure reactor system and a gas consumption monitoring system. A pressure drop in the reactor as a result of gas consumption is detected and the flow rate of gas to the reactor is adjusted to compensate for the pressure drop. Gas consumption is determined by measuring a drop in pressure in a gas holder due to the flow of gas from it to the constant pressure reactor system. The operations are controlled and automated by a control algorithm in a microcomputer.

12 Claims, 3 Drawing Sheets

GAS CONSUMPTION MEASURING SYSTEM

FIELD OF THE INVENTION

The present invention relates to a gas consumption measuring system which can be used to maintain constant or time variable pressure and to record continuously the consumption or production of gases.

BACKGROUND TO THE INVENTION

Batch type reactors are commonly employed in kinetic studies of catalytic processes which involve gas consumption or production. Hydrogenation, oxidation, hydroformylation, carbonylation and the polymerization of gaseous monomers are some examples of catalytic gas consumption reactions of commercial importance.

Conventional methods for gas/liquid reaction kinetic studies involve sampling the reaction mixture at specific time intervals and analyzing the samples using analytical techniques, such as infrared, ultraviolet-visible, mass or NMR spectroscopy and gas chromatography. A variety of manual and semi-automated gas consumption measuring systems have been reported. The major problems with these prior art systems are the relatively large sampling period and/or difficulty in data collection, which makes the study tedious and often subject to considerable error.

Reliable kinetic studies of gas consuming catalytic reactions carried out in a batch type reactor require a system in which it is possible to maintain a constant pressure with a minimum of pressure fluctuations in the batch reactor. The facility to display, store and analyze the kinetic data conveniently and at sampling time intervals specified by the operator is also of importance in carrying out reliable kinetic studies.

Several chemical reactions of interest involve gases along with liquid and/or solid substrates. By keeping the gas pressure constant and monitoring the amount of gas consumed, the amount of liquid and/or solid reacted can be estimated as a function of time. By carrying out a number of experiments with different gas pressures, temperatures, mixing rates, catalyst concentrations and other reaction parameters, for the system there can then be established a reaction rate law, rate constants can be estimated and the mechanism of the reaction elucidated.

SUMMARY OF INVENTION

The present invention enables such studies to be effected and the desired results to be obtained. The present invention provides a computer-controlled constant pressure reactor system which provides for easy reaction control and enables the acquisition of reliable kinetic data and its analysis with a high degree of precision.

The overall system provided by the present invention comprises two separate systems, namely a constant pressure reactor system and a gas consumption monitoring system. In the constant pressure reactor system, a pressure drop in the reactor as a result of gas consumption is detected and the flow rate of gas to the reactor is adjusted to compensate for the pressure drop. In the gas consumption monitoring system, gas consumption is determined by measuring a drop in pressure in a gas holder due to the flow of gas from it to the constant pressure reactor system.

DESCRIPTION OF PREFERRED EMBODIMENT

Figure 1:
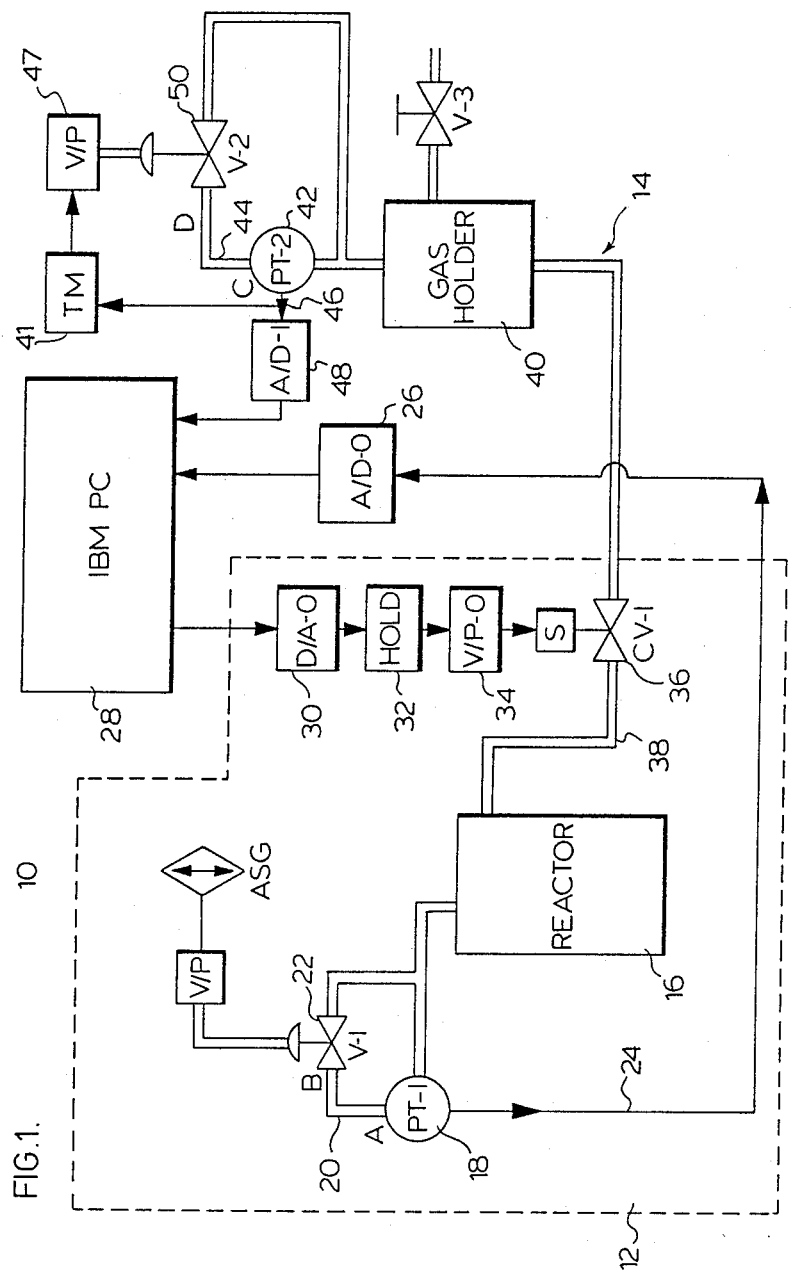
FIG. 1 is a schematic flow diagram of the overall system.

Referring to FIG. 1, an automated gas measuring system 10 comprises a constant pressure reactor system 12 and a gas consumption monitoring system 14. In the constant pressure system 12, a drop in pressure in a reactor 16 as a result of gas consumption is detected by a pressure transducer 18 (PT-1) and is compared with a reference pressure in a gas holder 20 (AB). The reference pressure in gas holder 20 can be set using an on/off valve 22 (V-1) prior to start of the gas/liquid and/or solid reaction in the reactor 16. A signal is generated by the pressure transducer 18 which, in the illustrated embodiment, may be an analog voltage, typically ±10 volts DC, and is the measured signal in line 24.

The measured analog signal is converted to digital, by an analog-to-digital converter 26 (A/D-O), processed by a control algorithm in a microcomputer 28, typically an IBM PC, and converted back to an analog signal by a digital-to-analog converter 30 (D/A-O). The digital-to-analog converter 30 is coupled with a zero-order hold element 32 having a high impedance output. The manipulated signals from the hold element 32 are converted to air pressure signals (about 3 to 15 psig) by a signal converter 34 (V/P-O) in order to render them suitable for use with pressure-actuated control valves or relays. The control signals then are fed back to a pressure-actuated control valve 36 (CV-1), which then permits the necessary amount of gas to flow through gas flow line 38 into the reactor 16 and readjusts the pressure accordingly. As a safety precaution, the magnitude of the manipulated signals may be limited to a certain range, outside which a warning alarm is triggered.

In the constant pressure system, the pressure of gas in the reactor 16 is constantly monitored, a drop in that pressure as a result of gas consumption is detected and a signal generated, the signal is processed by the control algorithm and the flow rate of gas through a valve to the reactor is adjusted to compensate for the pressure drop. Since the monitoring is almost constant, a substantially constant gas pressure may be maintained in the reactor 16.

The gas consumption monitoring system 14 involves the relatively simple principle of measurement of a drop in pressure in a gas holder 40 due to the flow of gas from it to the constant pressure reactor system 12. The consumption of gas in the constant pressure reactor 16 results in opening of the valve 36 by the functioning of the control system 12 discussed above. Opening of the flow valve 36 results in a decrease in pressure in the gas holder 40 which is detected by a pressure transducer 41 (PT-2) which is compared with the pressure in a gas holder 44 (CD). A signal is generated by the pressure transducer 42 which, in the illustrated embodiment, may be an analog voltage, typically ±10 volts DC, and is the measured signal in line 46. The signal is sent through an analog-to-digital converter 48 (A/D-1) to the direct digital controller comprising the IBM PC 28 and a Lab-master interface (Tecmar Xn), for storage on floppy disk, or other storage medium, pending further analysis.

An auto equalizer feed back loop is employed in monitoring the gas consumption, so as to provide flexibility and accuracy to the system. The signals generated by the transducer 42 are in the full scale range of ±10 volts DC for a prescribed pressure range. A high full scale pressure range results in a lower transducer sensitivity. A lower pressure range requires the equalizing of pressure across the transducer 42 when the full scale pressure limit is reached. This permits the use of a low full scale pressure range transducer and makes the system independent of the gas consumption limit set by the full scale pressure range of the pressure transducer 42. To achieve this flexibility, a trip module (TM) 41 is employed. When the signal generated by the pressure transducer 42 reaches the full scale limit, the trip module sends a signal, which is converted to a pressure signal (by V/P-47) actuates a valve 50 (V-2) and equalizes the pressure across the transducer 42.

The direct digital controller which controls the operation of the constant pressure system and the gas consumption monitoring system comprises several major elements. Central to the controller is the microcomputer 28, typically an IBM PC equipped with a PC mate Lab-master interface board, which is a combination of a 12 bit A/O converter along with a 16-channel multiplexer (shown as 26 and 48), a general purpose clock/timer and a D/A converter 30 (D/A-O) along with a zero-order hold element 32.

OPERATION

The overall operation of the control and monitoring system of FIG. 1 is controlled by a software program resident in the IBM PC 28 and comprises the following loops:

(i) a proportional control algorithm sub-routine to maintain constant pressure in the reactor 16, and (ii) a monitor and store loop to monitor gas consumption at operator specified time periods.

Figure 2:
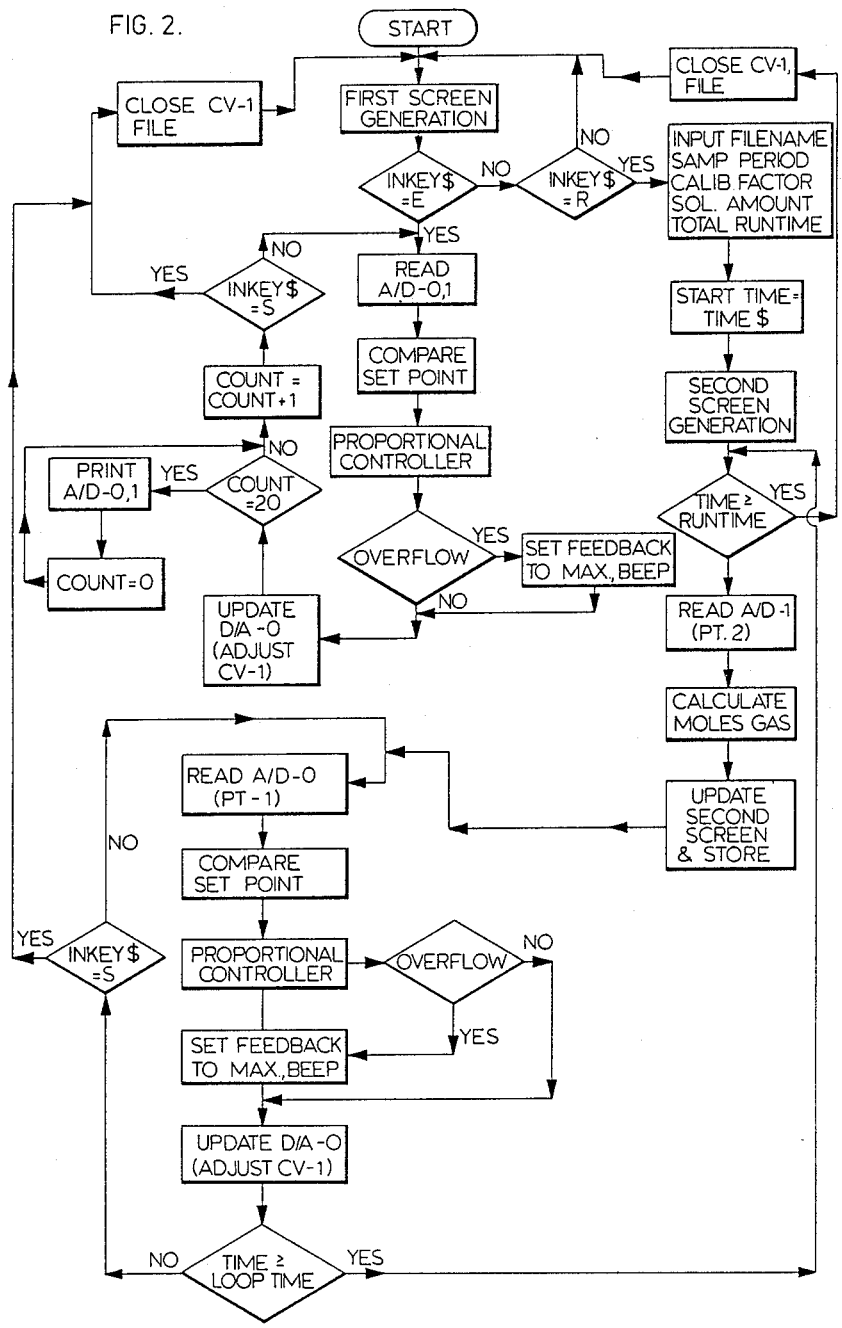
FIG. 2 is a flow chart for the software control program for the overall system of FIG. 1.

The flow chart for the software program is shown in FIG. 2. When the program is loaded and executed, the selection menu is displayed. Two options are provided, namely letter "E" for executing the equilibration option or the letter "R" for executing the run option.

The purpose of the equilibration option is to ensure that the pressure drop in the reactor 16 is due only to gas consumption from the reaction of interest and not due to solvent vapor pressure change, or expansion of gas in dead space in the reactor or leakage. This option is operated before the start of the gas uptake reaction (or before the addition of catalyst to initiate the gas consumption reaction). As seen from the flow chart given in FIG. 2, the equilibration loop adjusts any pressure drop and displays any pressure changes read from the pressure transducer 18 (A/D-O) and the pressure transducer 42 (A/D-1). When vapor-liquid equilibrium is reached and no pressure change is detected, the loop can be interrupted from the keyboard by pressing the letter "S" to go back to the selection menu (first screen display).

After the addition of catalyst to the reactor 16 to commence (the reaction under study), the run option is executed. The program asks for the necessary information, namely, filename to store online data, calibration factor for converting volts to consumption units, amount of the solvent used, expected total run time and sampling period with is the time interval between consecutive reporting and storing of the gas consumption. After obtaining the necessary information, the program repeatedly interrogates the keyboard for any key pressed. When a key is pressed, current time is recorded as start time and the second screen is displayed.

The program then tests the reaction time passed with the total expected run time and proceeds accordingly. If the time passed is less than the expected run time, A/D channel 1 (which is connected to PT-2, the gas consumption measuring transducer 42) is initialized and read. The voltages read are converted to gas consumed in millimolar units; the second screen is updated and the data is stored on a floppy disk or other storage medium.

The next step after reading and storing the gas consumed is to adjust the pressure in the reactor 16. This is accomplished by reading A/D-O (reading PT-1). The reading is compared with the set point and an error signal is generated. The error signal is fed to a proportional control algorithm and a manipulated signal is generated. A test is performed then to see if the manipulated signal has a value greater than the maximum range of the control valve. If the signal exceeds the maximum limit, the signal value is set to the maximum limit of the valve and a warning beep is produced. The manipulated signal is then fed-back to the D/A converter 30 (D/A-O) in order to adjust the pressure in the reactor 16. The loop then tests the time spent in the loop with the sampling period to report the gas consumption. Most of the CPU time in the run option, therefore, is spent here. When the time spent (typically 25 seconds, as specified by operator) in the loop reaches the sampling period, the loop is interrupted for a short time to measure gas consumption (by reading PT-2), update the second screen display and returns back to the constant pressure control loop.

To interrupt the control loop from the keyboard in order to stop the run before the total expected run time, letter "S" can be pressed, which results in closing control valve CV-1, and the online data file. The program then goes to the first screen generation algorithm.

In the system of the present invention, a very close control of reactor gas pressure is maintained by constant monitoring and feedback which, at the source, a very accurate measure of gas consumption can be obtained, leading to the generation of reliable kinetic data with respect to the process under consideration.

The system described above with respect to FIGS. 1 and 2 is not limited in its application to laboratory scale batch processes and kinetic studies but also is readily adaptable to commercial continuous processes to achieve process control and monitoring of process parameters to achieve consistency and uniformity of product.

EXAMPLE

The system illustrated in FIG. 1 was set up for a study of the catalytic hydrogenation of an acrylonitrile-butadiene copolymer (NBR). Chemical modification of NBRs through catalytic hydrogenation of carbon-carbon unsaturation offers a potentially useful method for altering and optimizing the service life of the rubber.

The catalytic test reaction was carried out in 2-butanone solvent and the catalyst used was chlorotris (triphenylphosphine) rhodium (I). The final polymer product was analyzed by NMR and IR spectroscopy and it was found that, under the reaction conditions employed, a quantitative hydrogenation of the carbon-carbon unsaturation present in the substrate polymer was achieved, with one mole of hydrogen being consumed per mole of carbon-carbon double bond unsaturation present.

Figure 3:
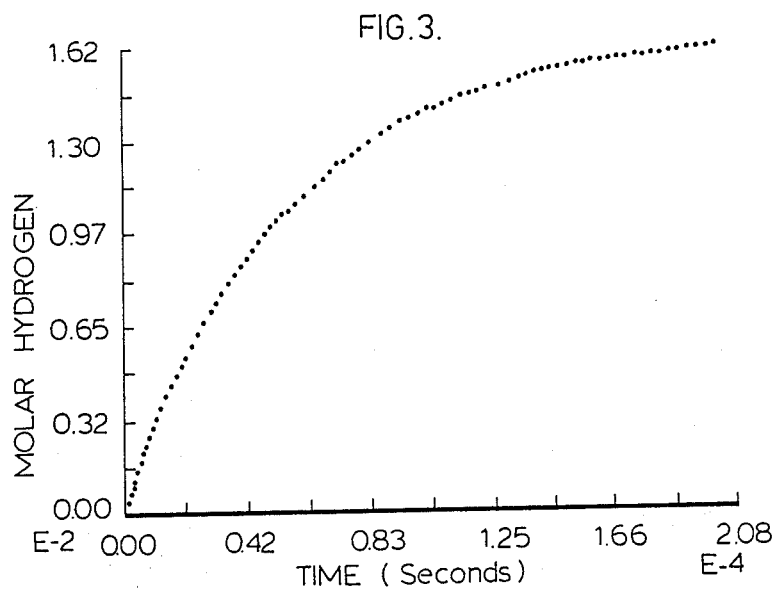
FIG. 3 is a graphical representation of hydrogen consumption with time in an application of the system of the invention (see Example below)

A representation plot of hydrogen consumption (mM) vs. time (sec.) obtained during the hydrogenation experiment appears as FIG. 3.

A pseudo first order rate experiment for the reaction is provided by the following equation:

$$\frac{d[C=C]}{dt} = k' [C=C] \quad (1)$$

The integrated form of this equation (1) is given as:

$$\ln [C=C] - \ln [C=C]_0 = -k' t \quad (2)$$

Equation (2) suggests a linear relationship between time versus concentration of C=C. The concentration of carbon-carbon unsaturation was calculated from the hydrogen consumption during the experiment (see FIG. 3) and the stoichiometry of the reaction involved. A plot of time versus ln [C=C] appears as FIG. 4.

Figure 4:
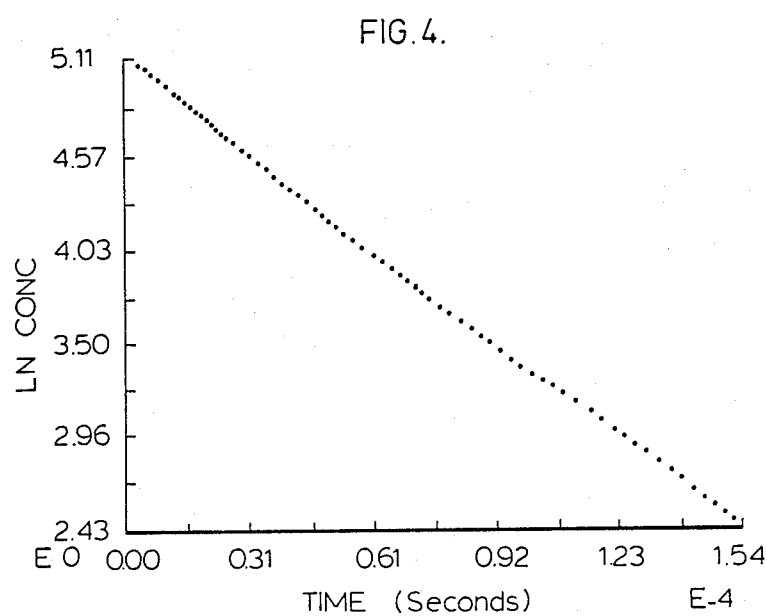
FIG. 4 is a graphical representation of time vs. ln [C=C] for a hydrogenation process application of the invention (see Example below).

It can be seen from this FIG. 4 that the reaction is pseudo first order with respect to [C=C] and the slope of the line in FIG. 4 provides a value of k'. By making a number of experimental runs with varying reaction parameters, different k' values were obtained. These k' values then were used to develop a kinetic rate expression and to estimate reaction rate constants and to elucidate the mechanism of the reaction.

SUMMARY OF DISCLOSURE

In summary of this disclosure, the present invention provides a novel computer-controlled batch reactor system which may be used for a variety of gas consuming or producing processes, to control the process and to monitor and determine important parameters of the process. Modifications are possible within the scope of this invention.

What we claim is:

1. A method of maintaining the pressure of a gas in a reaction zone substantially constant during chemical consumption of said gas in said reaction zone, which comprises:
   establishing a chemical reaction in said reaction zone wherein gas is consumed,
   continuously monitoring the gas pressure in said reaction zone during said chemical reaction by pressure transducer means connected to said reaction zone and comparing the pressure in said reaction zone to a reference pressure, said pressure transducer means being capable of generating an electrical signal of magnitude corresponding to a detected drop in pressure in said reaction zone, said electrical signal being an analog signal and being converted to a digital signal for processing an an algorithm resident in a microcomputer to generate a valve control signal,
   controlling the flow rate of said gas to said reaction zone through a pressure-actuated control valve through which said reaction zone is connected to a reservoir of said gas by said valve control signal to compensate for said gas consumption and to maintain a substantially constant pressure of said gas in said reaction zone during said chemical reaction.
   detecting a decrease in gas pressure in said reservoir by a second pressure transducer comparing the reservoir pressure to a second reference pressure.

2. The method of claim 1 wherein the consumption of gas by said reaction zone is determined by determining the drop in gas pressure in said reservoir as a result of flow of gas to the valve.

3. The method of claim 1 wherein said second pressure transducer is capable of generating an electrical signal of magnitude corresponding to the drop in pressure in said reservoir and corresponding to the consumption of gas by the reaction zone during said chemical reaction and the magnitude of the electrical signal is recorded and stored.

4. The method of claim 3 wherein said electrical signal is monitored by a trip module which generates a signal when the signal generated by the pressure transducer reaches its full scale limit and said trip module signal is converted to a pressure signal which actuates a valve to equalize the pressure across the transducer.

5. A method of controlling the pressure of a gas in a reaction zone connected to a reservoir of said gas through a pressure-actuated control valve, which comprises:
   establishing a chemical reaction in said reaction zone wherein said gas is consumed,
   continuously monitoring the gas pressure in said reaction zone during said chemical reaction,
   detecting a drop in said gas pressure as a result of said chemical consumption of said gas in said reaction zone during said chemical reaction and generating a signal indicative of said drop in pressure,
   generating a valve control signal from said pressure drop signal,
   adjusting the flow rate of said gas to said reaction zone through said control valve by said valve control signal to compensate for said gas consumption,
   detecting a decrease in gas pressure in said reservoir during said chemical reaction by a pressure transducer comparing the reservoir pressure to a reference pressure and generating an electrical signal of magnitude corresponding to the consumption of gas by the reaction zone during said chemical reaction,
   monitoring said electrical signal by a trip module which generates a signal when said electrical signal generated by the pressure transducer reaches its full scale limit, and
   converting said trip module signal to a pressure signal which actuates a second valve to equalize the pressure across the transducer.

6. The method of claim 5 wherein said monitoring of said gas pressure is effected by pressure transducer means connected to said reaction zone and comparing the pressure in said reaction zone to a reference pressure.

7. The method of claim 6 wherein said pressure transducer means is capable of generating an electrical signal of magnitude corresponding to a detected drop in pressure of said reaction zone.

8. The method of claim 7 wherein said electrical signal is an analog signal and is converted to a digital signal for processing by an algorithm resident in a microcomputer to generate said valve control signal.

9. The method of claim 8 wherein said valve is a pressure-actuated control valve and said valve control signal actuates the valve to control the flow rate to effect said compensation.

10. The method of claim 5 wherein said monitoring of said gas pressure is effected by second pressure transducer means connected to said reaction zone and comparing the pressure in said reaction zone to a reference pressure which is established by communication of said gas reservoir with the reaction zone followed by isolation of said gas reservoir.

11. The method of claim 5 which is controlled by a software program contained in a resident computer.

12. The method of claim 5 wherein said gas is hydrogen.

* * * * *